(12) United States Patent
Benoliel et al.

(10) Patent No.: US 12,125,152 B2
(45) Date of Patent: Oct. 22, 2024

(54) AUGMENTING REALITY BY CAPTURING SIGNALS USING WIRELESS RADIOS

(71) Applicant: Noodle Technology Inc., San Francisco, CA (US)

(72) Inventors: Micha Anthenor Benoliel, San Francisco, CA (US); Garrett Edward Kinsman, San Francisco, CA (US)

(73) Assignee: Noodle Technology Inc., San Francisco, CA (US)

( * ) Notice: Subject to any disclaimer, the term of this patent is extended or adjusted under 35 U.S.C. 154(b) by 0 days.

(21) Appl. No.: 17/754,127

(22) PCT Filed: Sep. 25, 2020

(86) PCT No.: PCT/US2020/052904
§ 371 (c)(1),
(2) Date: Mar. 24, 2022

(87) PCT Pub. No.: WO2021/062293
PCT Pub. Date: Apr. 1, 2021

(65) Prior Publication Data
US 2022/0375176 A1     Nov. 24, 2022

Related U.S. Application Data

(60) Provisional application No. 62/905,914, filed on Sep. 25, 2019.

(51) Int. Cl.
*G06T 19/00*     (2011.01)
*G02B 27/01*     (2006.01)
(Continued)

(52) U.S. Cl.
CPC ........ *G06T 19/006* (2013.01); *G02B 27/0101* (2013.01); *G06F 15/163* (2013.01); *H04W 64/003* (2013.01)

(58) Field of Classification Search
None
See application file for complete search history.

(56) References Cited

U.S. PATENT DOCUMENTS 7,035,897 B1   4/2006   Devereaux et al.
8,743,145 B1   6/2014   Price
(Continued)

FOREIGN PATENT DOCUMENTS

JP   2005-267355 A   9/2005
JP   2014179117 A   9/2014
(Continued)

OTHER PUBLICATIONS

First Notice of Preliminary Rejection in Korean Patent Application No. 10-2022-7013787 issued Jan. 16, 2023.
(Continued)

*Primary Examiner* — Robert J Craddock
(74) *Attorney, Agent, or Firm* — Jason W. Croft; Buchalter (57) ABSTRACT

In one example, a method may include receiving a wireless signal from a device. The device may be within an environment. The method may also include identifying the device. The device may be identified based on at least one of data and metadata included in the wireless signal. In addition, the method may include determining a location of the device within the environment. The location of the device within the environment may be determined based on the data included the wireless signal. Further, the method may include displaying an augmented environment representative of the environment and a symbol representative of the device within the augmented environment. The symbol may be displayed in a location within the augmented environment corresponding to the location of the device within the environment.

18 Claims, 4 Drawing Sheets

(51) Int. Cl.
*G06F 15/163* (2006.01)
*H04W 64/00* (2009.01)

(56) References Cited

U.S. PATENT DOCUMENTS

| | | |
|---|---|---|
| 11,741,498 B2 | 8/2023 | DeWitt et al. |
| 2003/0128100 A1 | 7/2003 | Burkhardt et al. |
| 2004/0100380 A1 | 5/2004 | Lindsay et al. |
| 2007/0162942 A1 | 7/2007 | Hamynen et al. |
| 2008/0030345 A1 | 2/2008 | Austin et al. |
| 2011/0196571 A1 | 8/2011 | Foladare et al. |
| 2011/0310227 A1 | 12/2011 | Konertz et al. |
| 2013/0109929 A1 | 5/2013 | Menzel |
| 2014/0105395 A1 | 4/2014 | Hart et al. |
| 2015/0029220 A1 | 1/2015 | Hittel et al. |
| 2017/0228935 A1 | 8/2017 | Foster et al. |

FOREIGN PATENT DOCUMENTS

| | | |
|---|---|---|
| JP | 2016192118 A | 11/2016 |
| KR | 10-2017-0018930 A | 2/2017 |
| KR | 10-2019-0108119 A | 9/2019 |
| WO | 2015/192117 A1 | 12/2015 |
| WO | 2018/136946 A1 | 7/2018 |
| WO | 2021062293 A1 | 4/2021 |

OTHER PUBLICATIONS

Extended European Search Report in European Patent Application No. 20868346.6 mailed Jan. 9, 2023.

Internation Search Report and Written Opinion in PCT/2020/052904 mailed Dec. 21, 2020.

Arulogun et al. "RFID-based students attendance management system." In: International Journal of Scientific & Engineering Research. Jul. 2013 (Jul. 2013) Retrieved on Nov. 18, 2020 (Nov. 18, 2020) from <URL: https://www.semanticscholar.org/paper/RFID-Based-Students-Attendance-Management-System-Arulogun/808f9cd0995559d743957eb751d79474baf96e0a>.

D'Orazio. "See the invisible wireless signals around you with this augmented reality app." In: The Verge. Nov. 28, 2015 (Nov. 28, 2015) Retrieved on Nov. 18, 2020 (Nov. 18, 2020) from <https://www.theverge.com/2015/11/28/9811910/augmented-reality-app-lets-you-see-wireless-signals>.

Office Action in Japanese patent application No. 2022-518667 mailed May 2, 2023.

Examination Report in Australian Patent Application 2020356625 mailed Feb. 9, 2023.

Final Office Action in Korean Application No. 10-2022-7013787 mailed Jul. 11, 2023.

Office Action for European Application No. 20868346.6, dated Aug. 22, 2023, 6 pages.

International Preliminary Report on Patentability for International Application No. PCT/US2020/052904, mailed Apr. 7, 2022, 10 pages.

Communication Pursuant to Rules 161(2) and 162 EPC for European Application No. 20868346.6, mailed May 4, 2022, 3 Pages.

Office Action for Japanese Application No. 20220518667, dated Oct. 24, 2023, 7 pages.

AUGMENTING REALITY BY CAPTURING SIGNALS USING WIRELESS RADIOS

BACKGROUND

The present disclosure generally relates to augmenting reality. In particular, the present disclosure describes systems and methods to augment reality by capturing signals using wireless radios.

Augmented reality (AR) and virtual reality (VR) include the practice of augmenting or replacing the real world with simulated elements or an entire simulated world. In addition, AR and VR may be used to enhance perceived reality of a user with additional graphics, text, sounds, video, etc. For example, AR and/or VR may add game characters to a simulated world, avatars of other users, etc. Accordingly, the present disclosure relates to augmenting reality by identifying devices by capturing signals using wireless radios.

The claimed subject matter is not limited to embodiments that solve any disadvantages or that operate only in environments such as those described above. This background is only provided to illustrate examples of where the present disclosure may be utilized.

SUMMARY

The present disclosure generally relates to augmenting reality. In particular, the present disclosure describes systems and methods to augment reality by identifying devices by capturing signals using wireless radios.

In one example, a method may include receiving a wireless signal from a device. The device may be within an environment. The method may also include identifying the device. The device may be identified based on at least one of data and metadata included in the wireless signal. In addition, the method may include determining a location of the device within the environment. The location of the device within the environment may be determined based on the data included the wireless signal. Further, the method may include displaying an augmented environment representative of the environment and a symbol representative of the device within the augmented environment. The symbol may be displayed in a location within the augmented environment corresponding to the location of the device within the environment.

In another example, a method may include receiving a first wireless signal from a first device. The first device may be within an environment. The method may also include receiving a second wireless signal from a second device. The second device may also be within the environment. In addition, the method may include identifying the first device. The first device may be identified based on at least one of data and metadata included in the first wireless signal. Further, the method may include identifying the second device. The second device may be identified based on at least one of data and metadata included in the second wireless signal. The method may include determining locations of the first device and second device within the environment. The location of the first device and the second device may be determined based on the first and second wireless signal. The method may also include displaying an augmented environment. The augmented environment may be representative of the environment and may include symbols representative of the first device and the second device. The symbols may be displayed in locations within the augmented environment corresponding to the locations of the first device and the second device within the environment.

This Summary introduces a selection of concepts in a simplified form that are further described below in the Detailed Description. This Summary is not intended to identify key features or essential characteristics of the claimed subject matter, nor is it intended to be used as an aid in determining the scope of the claimed subject matter.

DETAILED DESCRIPTION

Reference will be made to the drawings and specific language will be used to describe various aspects of the disclosure. Using the drawings and description in this manner should not be construed as limiting its scope. Additional aspects may be apparent in light of the disclosure, including the claims, or may be learned by practice.

As the number of wireless devices using standardized communication protocols (e.g., Bluetooth®) increase and the cost of producing the wireless devices decrease so do the possibilities of augmenting reality using wireless signals transmitted and received by these devices. In addition, as the number of wireless devices increase security and privacy concerns associated with these devices also increases, especially as environments in which wireless devices (e.g., IoT devices) expand more and more, for example, in commercial and industrial applications.

The discussion included in the present disclosure is generally made using examples of augmented environments. It is understood that the augmented environments may apply to augmented reality (AR), which includes enhancing a real environment (generally referred to in the present disclosure as "environment") with additional information and/or visuals and to virtual reality (VR), which includes replacing a view of the real environment with a simulated environment.

In some embodiments, to generate the augmented environment, devices (e.g., computing devices and/or sensors) within the environment may transmit wireless signals that include identifying information. For example, data included in the wireless signals may include identification information, location information, device/object characteristics descriptors, or any other appropriate type of data. Smart devices may receive the wireless signals from the various devices. The smart devices may include smart phones, computing devices, televisions, digital video disc (DVD) players, VR headsets, cell phones, tablets, personal computers, or any other appropriate device.

The smart devices may identify one or more of the devices within the environment using the wireless signals. In some embodiments, the identification process may include determining a type of each of the devices transmitting the wireless signals. Additionally, in some embodiments, one or more of the devices may include sensors physically attached to objects that are not configured to transmit wireless signals. For example, a sensor may be physically attached to a sofa located within a room of a residential building. The sensors may transmit the wireless signals including data related to the corresponding object. For example, the data may indicate that the object is the sofa and corresponding dimensions of the sofa. In these and other embodiments, the identification process may include determining a type of each of the objects associated with the sensors.

In at least one embodiment, the data may indicate purchase information for the object. For example, the data may indicate, for the sofa, a price, an availability, a delivery time, a service associated with the sofa, etc. In a further example, a hotel room may include a number of objects that each transmit wireless signals including data related to the corresponding object. For example, the hotel room may include a television, sofa, mattress, hair dryer, chair, desk, etc. Each of those items may transmit wireless signals including data of any type of information about the corresponding product. Additionally, the data may include purchase information for any or all of the objects. In an example, a user may use a user device to receive and view the data about the objects in the hotel room. The user, for example, may purchase an item, such as a new mattress that is the same model as the one in the hotel room. The user may select delivery of the mattress at the user's house, which may be delivered and ready for the user when the user returns home from the hotel. In yet a further example, the user may purchase the object itself or a service for the object, which may include any service. For example, the user may purchase an installation service or a protection plan for the object.

The smart devices may also determine a location of one or more of the devices and/or objects within the environment. In some embodiments, at least some of the wireless signals may include data indicating a physical location of the corresponding devices or objects within the environment. In these and other embodiments, the smart devices may be configured to determine the location of one or more of the devices or objects based on signal characteristics of the corresponding wireless signals. In some embodiments, the smart devices may determine the physical location of one or more of the devices relative to each other. In these and other embodiments, the smart devices may determine the physical location of one or more of the devices relative to the physical location of the smart devices. Additionally or alternatively, the smart devices may determine the physical locations of one or more of the devices relative to an exterior boundary of the environment (e.g., relative to a physical boundary, such as a wall, building, body of water, a painted line, or any other object that could create a boundary).

The smart devices may include displays. The smart devices, via the displays, may display the augmented environment. The augmented environment may be displayed representative of the environment. In addition, the smart devices may also display symbols representative of one or more of the devices and/or the objects within the augmented environment. For example, the smart devices may display symbols of sofas, personal computers, televisions, smartphones, DVD players, storefronts, buildings, vehicles, people, tools, medical devices, park benches, landmarks, cameras, or any other appropriate device or object. In some embodiments, the smart devices may display the symbols in locations within the augmented environment corresponding to the locations of the devices within the environment. In addition, the smart devices may display additional information regarding the devices and/or the objects. The additional information that is visible in the augmented environment may be greater than compared to the information that is visible in the environment. For example, the additional information may include characteristics of the devices and/or the objects such as weight, height, age, medical history, attendance history, current sales, sales descriptions, goods and/or services offered, goods descriptions, service descriptions, year of production, production make, production model, or any other appropriate information corresponding to the devices and/or the objects. Including the additional information in the augmented environment may improve an experience of the users of the smart devices.

Accordingly, the present disclosure describes systems and methods for augmenting reality. In particular, the present disclosure describes systems and methods to augment reality by capturing signals using wireless radios.

Figure 1:
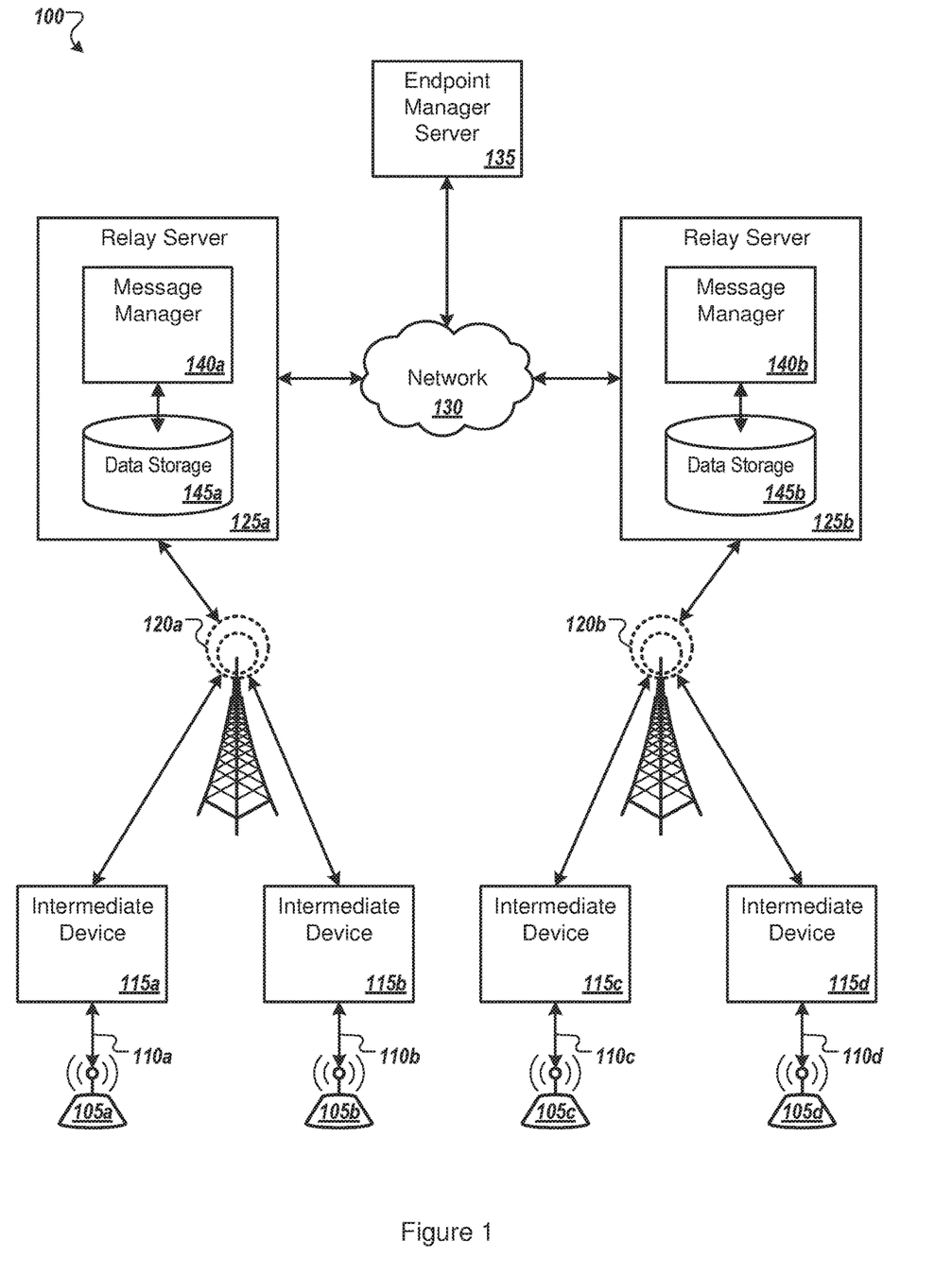
FIG. 1 illustrates an example network architecture.

FIG. 1 illustrates an example network architecture 100 in which embodiments of the present disclosure may be implemented. The network architecture 100 may include one or more endpoint devices 105, one or more intermediate devices 115, one or more relay servers 125, and one or more endpoint manager servers 135. In some embodiments, the network architecture 100 may be capable to move data between one or more endpoint devices 105 and various endpoint manager servers 135 by way of crowd-sourced intermediate devices 115, which may function as network clients, and one or more relay servers 125.

An endpoint device 105 may include one or more wireless devices (e.g., IoT devices). The endpoint device 105 may include a power supply, a data collection device (e.g., a sensor), and a network device. The power supply may include a battery or a connection to a power grid. Additionally or alternatively, the power supply may include an energy harvesting apparatus, such as a solar panel, solar cell, solar photovoltaic, electromagnetic, etc. In at least some embodiments, the endpoint device 105 may not include a power supply and may instead use ambient backscatter techniques. The endpoint device 105 may also include one or more sensors. The one or more sensors may be configured to detect any type of condition, and generate electronic data based on a detected condition. For example, the endpoint device 105 may include a smart watch with a heart rate monitor that is configured to generate heart rate data using heart rate conditions collected by the heart rate monitor. In some embodiments, the endpoint device 105 does not have capability to communicate over the Internet and only includes hardware and/or software capable of communicating with nearby devices (e.g., includes only a sensor), such as a nearby intermediate device 115. In other embodiments, the endpoint device 105 may include hardware and/or software to communicate over the Internet. In at least one embodiment, the endpoint device 105 may include a hardware secure element (SE) that is capable of securely hosting applications and storing confidential and cryptographic data.

The network device of the endpoint device 105 may include any hardware, software, or combination thereof that is capable to communicate with another device via a wireless network. In at least one embodiment, the network device may include any network controller configured to communicate via a short-range network, such as Bluetooth® or any other short-range network. In at least one embodiment, the network device may include any network controller configured to communicate via a low-power network. Example endpoint devices 105 include, but are not limited to, industrial devices, residential appliances, commercial equipment, inventory trackers, smart watches, wearables, heart rate monitors, logistics trackers, environmental sensors, cash registers, credit card readers, point-of-sale (POS), bikes, electric scooters, electric skateboards, vehicles, cars, electric cars, satellites, smart devices, or any device (mobile and not mobile that includes a wireless radio interface). The network architecture 100 may include any number of endpoint devices 105 and the endpoint devices 105 in the network architecture 100 may be any type of endpoint device 105, including any type of network-capable device. In some embodiments, the endpoint devices 105 may be fixed or relatively stationary in the network architecture 100, such as a POS, a pollution sensor, a sensor attached to a stationary object, or a personal computer. Additionally or alternatively, the endpoint devices 105 may be mobile, such as a smart watch, smart phones, laptops, tables, or any car or vehicle.

The one or more endpoint devices 105 may be configured to communicate with other devices via at least one wireless network 110. For example, a first endpoint device 105a may be in electronic communication with a first intermediate device 115a via a wireless network 110a. The one or more intermediate devices 115 may include any type of device capable of communicating with an endpoint device 105 via the wireless network 110 and with a relay server 125 via a second network 120. In at least one embodiment, an intermediate device 115 may include two network controllers, a first network controller to communicate via the wireless network 110 and a second network controller to communicate via the second network 120. Example intermediate devices 115 include mobile devices, personal computers (PC), laptops, smart phones, netbooks, e-readers, personal digital assistants (PDA), cellular phones, mobile phones, tablets, vehicles, drones, cars, trucks, wearable devices, glasses, routers, televisions, or set top boxes, etc.

As illustrated, the first endpoint device 105a may be in electronic communication with the first intermediate device 115a via the wireless network 110a (e.g., a short-range network). Further, a second endpoint device 105b may be in electronic communication with a second intermediate device 115b via another wireless network 110b (e.g., a low-power network). A third endpoint device 105c may be in electronic communication with a third intermediate device 115c via another wireless network 110c. A fourth endpoint device 105d may be in electronic communication with a fourth intermediate device 115d via another wireless network 110d.

In some embodiments, the wireless network 110 may be any network that uses a relatively low amount of power. Example wireless networks 110 may include any Bluetooth® network type (e.g., Bluetooth Low Energy (BLE), Bluetooth 4.0, Bluetooth 5.0, Bluetooth Long Range), NB-IoT, LTE Direct, LTE-M, LTE M2M, 5G, Wi-Fi, Wi-Fi Aware, mmWave, or any other type of network. The one or more endpoint devices 105 may connect to various intermediate devices 115 using different types of wireless networks 110. For example, the first endpoint device 105a may be in electronic communication with the first intermediate device 115a via a first short-range wireless network 110a and the second endpoint device 105b may be in electronic communication with the second intermediate device 115b via a second short-range wireless network 110b.

The endpoint devices 105, the intermediate devices 115, or both, may be fixed, relatively stationary or moveable. When an endpoint device 105 and an intermediate device 115 come into wireless range of each other, the endpoint device 105 and the intermediate device 115 may perform a handshake and/or authentication to initiate data exchange between the endpoint device 105 and the intermediate device 115.

In some embodiments, the endpoint device 105 may periodically send beacons (e.g., wireless signals) that include data via the wireless network 110. The endpoint devices 105 may include various services that may run on the endpoint devices 105. For example, a smart watch may include a clock service, a heart rate monitor service, a motion detection service, a music service, etc. Beacons may be generated for each of these services or a single beacon may be generated to include data for some or all of the services.

An intermediate device 115 may listen for such beacons from endpoint devices. Responsive to receiving a beacon, the intermediate device 115 may send the beacon to a relay server 125 via a second network 120. In at least one embodiment, the wireless network 110 and the second network 120 are different types of networks. For example, the wireless network 110 may be a Bluetooth® network and the second network 120 may be a cellular network, Wi-Fi, or the Internet. Responsive to receiving a beacon, the intermediate device 115 may also generate an augmented reality or virtual reality element for display at the intermediate device 115. For example, responsive to receiving a beacon from a connected skateboard device 105, a pair of glasses 115 may present, via a display, information about the skateboard. For example, a user wearing the glasses 115 may be walking outside and another uses passed by on the connected skateboard 105. The glasses 115 may provide information about the skateboard 115, such as via one or more augmented reality elements. Before providing the information, the glasses 115 may present a notification that, when activated by the wearer of the glasses 115, causes the glasses 115 to provide the information. The information may include purchase information such that the wearer of the glasses 115 can purchase the skateboard 115 and have it shipped to a location of their choosing.

The second network 120 may include a public network (e.g., the Internet), a private network (e.g., a local area network (LAN) or wide area network (WAN)), a wired network (e.g., Ethernet network), a wireless network (e.g., an 802.xx network or a Wi-Fi network), a cellular network (e.g., a Long Term Evolution (LTE) or LTE-Advanced network, 1G, 2G, 3G, 4G, 5G, 6G, etc.), routers, hubs, switches, server computers, and/or a combination thereof.

The relay server 125 may send the beacon, or information related to the beacon, to an endpoint manager server 135 via a third network 130. The third network 130 may include a public network (e.g., the Internet), a private network (e.g., a local area network (LAN) or wide area network (WAN)), a wired network (e.g., Ethernet network), a wireless network (e.g., an 802.xx network or a Wi-Fi network), a cellular network (e.g., a Long Term Evolution (LTE) or LTE-Advanced network, 1G, 2G, 3G, 4G, 5G, 6G, etc.), routers, hubs, switches, server computers, and/or a combination thereof. In at least one embodiment, the second network 120 and the third network 130 are the same network or include at least some overlapping components.

The one or more relay servers 125 may include one or more computing devices, such as a rackmount server, a router computer, a server computer, a personal computer, a mainframe computer, a laptop computer, a tablet computer, a desktop computer, smartphone, cars, drones, a robot, any mobility device that has an operating system, etc.), data stores (e.g., hard disks, memories, databases), networks, software components, and/or hardware components. The one or more relay servers 125 may be configured to receive a beacon from an intermediate device 115. The one or more relay servers 125 may send the beacon, or data related to or associated with the beacon to an endpoint manager server 135. The one or more relay servers 125 may receive a message from the endpoint manager server 135 and, in some embodiments, may send the message from the endpoint manager server 135 to an intermediate device 115. In at least some embodiments, the intermediate device 115 may perform one or more operations responsive to receiving the message from the endpoint manager server 135. The operations include operations local to the intermediate device 115, and/or sending the message from the endpoint manager server 135 to an endpoint device 105.

The endpoint manager server 135 may include one or more computing devices, such as a rackmount server, a router computer, a server computer, a personal computer, a mainframe computer, a laptop computer, a tablet computer, a desktop computer, a smartphone, a car, a drone, a robot, any mobility device that has an operating system etc.), data stores (e.g., hard disks, memories, databases), networks, software components, and/or hardware components. The endpoint manager server 135 may be associated with one or more endpoint devices 105. For example, a particular corporation, person, or manufacturer may sell an endpoint device 105 and may use an endpoint manager server 135 to communicate with, control, or to store data related to the endpoint device 105.

The endpoint manager server 135 may send messages associated with a particular endpoint device 105, or a set of endpoint devices 105. For example, the endpoint manager server 135 may send information describing characteristics or features of a particular endpoint device 105, or the set of endpoint devices 105. In addition, in some embodiments, the endpoint manager server 135 may send other communications to an endpoint device 105, such as a response to a request from a beacon generated by the particular endpoint device 105.

Each relay server 125 may include a message manager 140. The message manager 140 may be implemented using hardware including a processor, a microprocessor (e.g., to perform or control performance of one or more operations), an FPGA, or an ASIC. In some other instances, the message manager 140 may be implemented using a combination of hardware and software. Implementation in software may include rapid activation and deactivation of one or more transistors or transistor elements such as may be included in the hardware of a computing system (e.g., the relay server 125). Additionally, software defined instructions may operate on information within transistor elements. Implementation of software instructions may at least temporarily reconfigure electronic pathways and transform computing hardware.

Each relay server 125 may include a data storage 145. The data storage 145 may include any memory or data storage. In some embodiments, the data storage 145 may include computer-readable storage media for carrying or having computer-executable instructions or data structures stored thereon. The computer-readable storage media may include any available media that may be accessed by a general-purpose or special-purpose computer, such as a processor. For example, the data storage 145 may include computer-readable storage media that may be tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may be included in the data storage 145. In the depicted embodiment, the data storage 145 is part of the relay server 125. In some embodiments, the data storage 145 may be separate from the relay server 125 and may access the data storage 145 via a network. In at least one embodiment, the data storage 145 may include multiple data storages.

The data storage 145 may include data pertaining to the endpoint devices 105, intermediate devices 115, and endpoint manager servers 135 and relationships between the endpoint devices 105, intermediate devices 115, and endpoint manager servers 135. For example, the data storage 145 may include a table or list of endpoint devices that are associated with a particular endpoint manager server 135. The data storage 145 may include data pertaining to beacons received from endpoint devices, such as a timestamp of the receipt of the beacon, a timestamp associated with the creation of the beacon, a geo-location associated with the beacon and/or the endpoint device 105 that created or transmitted the beacon, sensor data associated with the endpoint device 105, routing information for how and/or where to send data between the endpoint manager servers 135 and the endpoint devices 105, connection strengths between the intermediate devices 115 and the endpoint devices 105, proximity of an endpoint device 105 to an intermediate device 115, type of wireless network 110 that connects an intermediate device 115 with an endpoint device 105, a cost of a connection between an intermediate device 115 and an endpoint device 105, a current battery level of the intermediate device, a type of intermediate device, etc.

The message manager 140 may process communications between the endpoint devices 105, the intermediate devices 115, and the endpoint manager server(s) 135. In an example, the message manager 140 may receive a beacon from the first intermediate device 115*a* via the second network 120. The beacon may have been sent to the first intermediate device 115*a* via the wireless network 110*a* by endpoint device 105*a*. A beacon may contain characteristics about the endpoint device 105*a*, including an identifier of the endpoint device 105*a* (e.g., a MAC address, a unique ID), a geographical location of the endpoint device 105*a*, and advertisements of the UUIDs of the services it supports, etc. The message manager 140 may identify the characteristics of the beacon, such as by analyzing the beacon to identify information pertaining to the beacon. The message manager 140 may access the data storage 145 to identify, based on the characteristics of the beacon, an endpoint manager server 135 that is associated with the beacon. For example, the identifier of the endpoint device may be associated with a particular manufacturer that operations a particular endpoint manager server 135. The message manager 140 may identify this particular endpoint manager server 135 in the data storage 145 and an address and/or path to send the beacon in order to reach the endpoint manager server 135. In at least some embodiments, the message manager 140 may send the beacon, or a beacon message to the endpoint manager server 135 via the third network 130. The beacon message may include the beacon, may not include the beacon, or may include information pertaining to the beacon.

In at least one embodiment, a beacon may include data from multiple services associated with the endpoint device 105. Additionally or alternatively, multiple beacons from a single endpoint device 105 may be generated and broadcast via the wireless network 110. Each of these multiple beacons, for example, may be associated with a different service associated with the endpoint device 105. Alternatively, each of these multiple beacons, for example, may be associated with a different network type of the wireless network 110. The message manager 140 may identify the services and/or the network type and based on information for the service, identify an appropriate endpoint manager server 135 that should receive a beacon message.

The endpoint manager server 135 may receive the message from the relay server 125. The endpoint manager server 135 may store the message, process the message, generate a report based on the message, may generate a notification or response based on the message, or any other action. For example, endpoint manager server 135 may generate a response message pertaining to the beacon message. The response message may include a message intended for one or more of the relay servers 125, the intermediate devices 115, the endpoint device 105 that generated the beacon, or another endpoint device 105 that did not generate the beacon. The endpoint manager server 135 may send the response message to the same relay server 125 that sent the beacon message to the endpoint manager server 135 (e.g., the relay server 125a), or to a different relay server 125 that did not send the beacon message to the endpoint manager server 135 (e.g., relay server 125b).

The relay server 125 may receive, from the endpoint manager server 135, the response message pertaining to the beacon message. The relay server 125 may process the response message, such as by performing operations at the relay server 125, sending data to another device (e.g., a user device), sending data to an endpoint device 105, etc.

In some embodiments, the network architecture 100 may be used to exchange data between any devices capable of network-based communication over the Internet. In an example, the network architecture 100 may leverage existing smartphone infrastructure to create delay-tolerant connectivity. The network architecture 100 can move data to the cloud in an initially delay tolerant fashion, which may be useful for many types of wireless communication (e.g., IoT communications) such as firmware updates, status updates, log-file storage, and micropayments. The intermediate devices 115 may include software that runs on smartphones to periodically scan for other devices (e.g., the endpoint devices 105) like industrial devices, smartwatches, wearables, logistics trackers, and environmental sensors. These endpoint devices 105 may connect with the software client running on the smartphones to create massive, area wide networks for moving data to and within the cloud.

Further, it has been estimated that 95% of the human population is covered by some sort of cellular service. The network architecture 100 can be deployed anywhere in the world and enables regions of lower connectivity to increase their connectivity. Moreover, the network architecture 100 can provide coverage beyond the reach of conventional cellular networks by using software that runs on Bluetooth®-enabled smartphones, for example. Users may travel to areas of limited or no cellular connectivity, but still may receive beacons from endpoint devices 105 via the wireless network 110. Using the network architecture 100, users of the intermediate devices 115 or the endpoint devices 105, can now easily generate an augmented environment as described in the present disclosure.

Modifications, additions, or omissions may be made to the network architecture 100 without departing from the scope of the present disclosure. The present disclosure more generally applies to the network architecture 100 including one or more endpoint devices 105, one or more wireless networks, one or more intermediate devices 115, one or more second networks 120, one or more relay servers 125, one or more third networks 130, and one or more endpoint manager servers 135 or any combination thereof.

Moreover, the separation of various components in the embodiments described herein is not meant to indicate that the separation occurs in all embodiments. In addition, it may be understood with the benefit of this disclosure that the described components may be integrated together in a single component or separated into multiple components.

Figure 2:
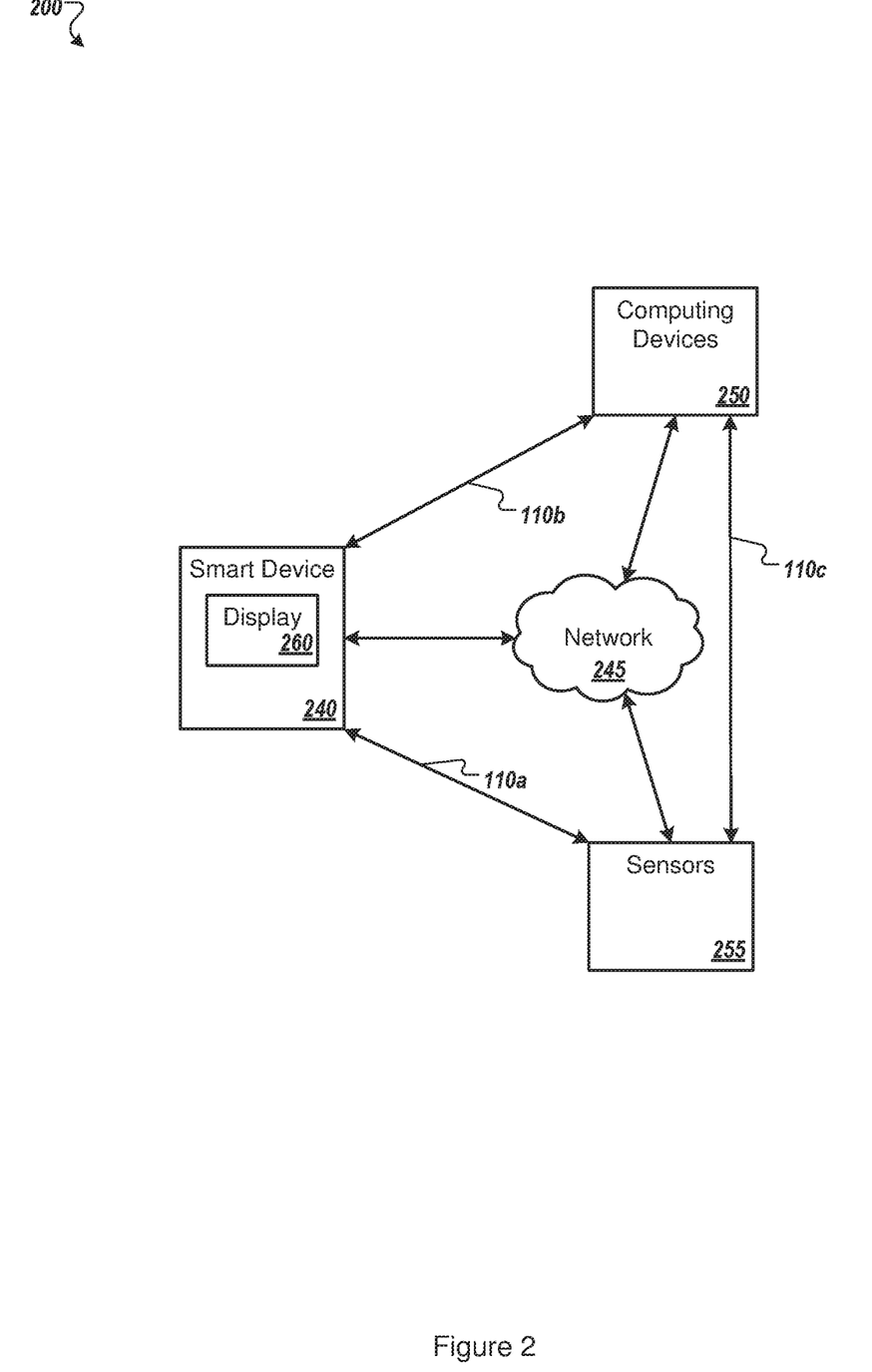
FIG. 2 illustrates an example environment for augmenting reality by capturing signals using wireless radios.

FIG. 2 illustrates an example environment 200 for augmenting reality by capturing signals using wireless radios. The environment 200 may include a smart device 240 configured to wirelessly communicate with computing device 250 and/or sensors 255. The smart device 240, the computing devices 250, and the sensors 255 may correspond to the intermediate devices 115 and/or the endpoint devices 105 of FIG. 1.

In some embodiments, the smart device 240, the computing devices 250, and the sensors 255 may be configured to communicate over a network 245. The network 245 may include a public network (e.g., the Internet), a private network (e.g., a local area network (LAN) or wide area network (WAN)), a wired network (e.g., Ethernet network), a wireless network (e.g., an 802.xx network or a Wi-Fi network), a cellular network (e.g., a Long Term Evolution (LTE) or LTE-Advanced network, 1G, 2G, 3G, 4G, 5G, etc.), routers, hubs, switches, server computers, and/or a combination thereof. In some embodiments, the smart device 240, the computing devices 250, and the sensors 255 may be configured to communicate with each other over the wireless network 110. In at least one embodiment, the wireless network 110 and the network 245 are the same network or include at least some overlapping components.

In some embodiments, the sensors 255 may include devices configured to be physically attached to an object not configured for wireless communication (e.g., a non-computing device or a computing device that does not include a wireless card). For example, the sensors 255 may be attached to a piece of furniture, a shelving unit, a picture, a painting, a PC, or any other object. The sensors 255 may be configured to transmit wireless signals that includes data corresponding to the objects. For example, if the sensors 255 are attached to pieces of furniture, the sensors 255 may transmit wireless signals that include dimensions, weight, and/or physical location of the pieces of furniture within the environment 200. In at least one embodiment, the sensors 255 may include a hardware secure element.

In some embodiments, the computing devices 250 may include devices configured for wireless communication. For example, the computing devices 250 may include a tablet, a smart phone, a mobile device, a smart television, a smart DVD player, or any other appropriate device. The computing devices 250 may transmit wireless signals that include data corresponding to the computing devices 250. For example, the wireless signals transmitted by the computing devices 250 may include a device identifier, a device descriptor, a physical location of the computing device, or any other appropriate data.

The smart device 240 may receive the wireless signals from the computing devices 250 and the sensors 255. In some embodiments, the smart device 240 may receive the wireless signals via the wireless network 110. In other embodiments, the smart device 240 may receive the wireless signals via the network 245. In some embodiments, the smart device 240 may receive a portion of the wireless signals via the wireless network 110 and another portion of the wireless signals via the network 245.

The smart device 240 may identify the computing devices 250 and/or the sensors based on the wireless signals. In some embodiments, the wireless signals may include metadata corresponding to a type of signal of the wireless signal. For example, the metadata may indicate that the wireless signals are sent using a communication protocol including Bluetooth, Wi-Fi, or another type of communication protocol. As another example, the metadata may indicate a frequency band (e.g., a type of wireless signal) of the wireless signals. In these and other embodiments, the smart device 240 may identify the computing devices 250 and/or the sensors 255 based on the metadata.

In some embodiments, the wireless signals may include data corresponding to the computing devices 250 and/or the objects the sensors 255 are attached to. For example, the data included in the wireless signals may include a device identifier, characteristic descriptions of the computing devices 250 and/or the objects the sensors 255 are attached to, a published MAC address of the computing devices 250, or any other appropriate data. In these and other embodiments, the smart device 240 may identify the computing devices 250 and/or the sensors 255 based on the data included in the wireless signals. For example, the smart device 240 may determine the published MAC address of the computing devices 250 to be included in the augmented environment.

In some embodiments, the smart device 240 may determine that additional information for the computing devices 250 and/or the objects the sensors 255 are attached to may be available in the relay server 125 and/or the endpoint manager server 135 (not illustrated in FIG. 2). In these and other embodiments, the smart device 240 may transmit request messages (e.g., beacons) to the relay servers 125 or the endpoint manager servers 135 associated with one or more of the computing devices 250 and/or the sensors 255. In these and other embodiments, the request messages may identify particular computing devices 250 and/or sensors 255 that wireless signals have been received from. In addition, the request messages may request the additional information regarding the computing devices 250 and/or the sensors 255 that wireless signals have been received from.

The smart device 240 may determine the locations of the computing devices 250 and the sensors 255 within the environment 200. The locations of the computing device 250 and the sensors 255/the objects the sensors 255 are attached to within the environment 200 may be determined based on the wireless signals. In some embodiments, the wireless signals may include location information of the corresponding computing devices 250 and the sensors 255/the objects the sensors 255 are attached to. In other embodiments, the locations of the corresponding computing devices 250 and the sensors 255/the objects the sensors 255 are attached to may be determined based on characteristics of the wireless signals. For example, a signal strength of the wireless signals may be used.

In some embodiments, the smart device 240 may determine the physical location of the corresponding computing devices 250 and the sensors 255/the objects the sensors 255 are attached to relative to each other. In these and other embodiments, the smart device 240 may determine the physical location of the corresponding computing devices 250 and the sensors 255/the objects the sensors 255 are attached to relative to the physical location of the smart device 240. Additionally or alternatively, the smart device 240 may determine the physical locations of the corresponding computing devices 250 and the sensors 255/the objects the sensors 255 are attached to relative to an exterior boundary of the environment 200.

The smart device 240 may include a display 260. The smart device 240, via the display 260, may display the augmented environment. In some embodiments, the augmented environment may be displayed to represent the environment 200 and the different computing devices 250 and/or the objects located within the environment 200. For example, the augmented environment may include symbols representative of the smart device 240, one or more of the computing devices 250, and/or one or more of the objects the sensors 255 are attached to. In some embodiments, the smart device 240 may include a mobile device or wearable device configured to move at least within the environment 200. In other embodiments, the smart device 240 may include a stationary device configured to be stationary within the environment 200.

The augmented environment may be displayed such that the symbols being displayed are displayed in a location within the augmented environment that corresponds to the location of the corresponding computing devices 250 and the objects within the environment 200. In some embodiments, the augmented environment may include a three-dimensional representation of the environment 200. For example, the augmented environment may include simulated walls of a room, a height of the computing devices 250 or the objects, shelves, or any other appropriate device and/or object within the environment 200. As another example, each piece of furniture in a room may be attached to a corresponding sensor 255. The corresponding sensors 255 may transmit the wireless signals to include physical characteristics such as dimensions, weight shape, material, or manufacturer of the furniture. The smart device 240 may receive these wireless signals and construct the augmented environment to be a three-dimensional representation and include three dimensional representations of each piece of furniture within the room.

An example implementation of the present disclosure may include situations where the environment 200 is dark (e.g., does not include light) but people moving around within the environment 200 need to know what objects are within the environment 200 to be able to safely maneuver through the environment 200 (e.g., military, police, first responders or other people responding to an emergency or natural disaster). For example, a user, using the smart device 240, could detect whether there are any people trapped by rubble of a collapsed building after an earthquake. As another example, a user, using the smart device 240, could detect whether there are any people and/or animals trapped in a building during an emergency.

In a specific example environment 200, the smart device 240 may generate an augmented environment representative of a warehouse and assets within the warehouse (e.g., the assets may be objects to which the sensors 255 are attached to, for example, packaging of the assets). A user of the smart device 240 may indicate that a particular asset is lost, such as by using a mobile application or website. For example, the lost status of the particular asset may be provided to the endpoint manager server 135 or to the relay server 125. In a first embodiment, the endpoint manager server 135 may send a message to the smart device 240 that the particular asset is lost. The message may include an identifier of the lost asset. The smart device 240 or a dongle communicatively coupled to the smart device 240 may be positioned within the warehouse (e.g., a dongle attached to a personal computer configured to receive wireless signals so that the personal computer itself does not need to be within the warehouse). In some embodiments, the smart device 240 may only receive wireless signals from the sensors 255 since the asset is an object. In other embodiments, the smart device 240 may receive the wireless signals from both the sensors 255 and the computing devices 250 but may filter out the wireless signals received from the computing devices 250. The smart device 240 may filter out information corresponding to objects that are not the lost asset. The smart device 240, via the display 260, may display the augmented environment representative of the warehouse. In addition, the smart device 240 may display a symbol representative of the lost asset within the augmented environment. Further, in some embodiments, additional information regarding the lost asset may be displayed in the augmented environment. For example, the additional information may indicate a physical location of the lost asset within the warehouse.

The user may be able to determine a physical location or a last known physical location of the lost asset within the warehouse based on the location of the symbol in the augmented environment and/or the additional information. For example, the augmented environment may include simulated shelves representative of actual shelves within the warehouse and the symbol representative of the lost asset may be displayed as being on one of the simulated shelves. Thus, the user may determine which actual shelf corresponds to the simulated shelf in the augmented environment.

In another specific example, the environment 200 may include a shopping area (e.g., a shopping mall, street shops, etc.). The computing devices 250 and/or the sensors 255 may be located within a store or attached to a store front in the shopping area. A user of the smart device 240 may enter the shopping area and the smart device 240 may receive the wireless signals from the computing devices 250 and/or the sensors 255. The smart device 240, via the display 260, may display the augmented environment representative of the shopping area. In addition, the smart device 240 may display a symbol within the augmented environment representative of each of the stores within the shopping area for which a wireless signal was received from the computing devices 250 and the sensors 255. Further, in some embodiments, additional information regarding the stores may be displayed in the augmented environment. For example, the additional information may indicate current or upcoming sales, available goods or services, or current or upcoming events at the stores. Further, in some embodiments, the smart device 240 may compare goods or services included a virtual wish list created by the user to the goods and services indicated in the wireless signals. In these and other embodiments, the augmented environment may include the additional information indicating which goods or services that are in the stores are also included in the virtual wish list.

In yet another specific example, the environment 200 may include a grocery store or another type of food vendor. The computing devices 250 and/or the sensors 255 may be located by or attached to food goods available in the grocery store. A user of the smart device 240 may enter the grocery store and the smart device 240 may receive wireless signals from the computing devices 250 and/or the sensors 255. The smart device 240, via the display 260, may display the augmented environment representative of the grocery store. In addition, the smart device 240 may display one or more symbols within the augmented environment representative for each of the food goods for which a wireless signal is received from the computing devices 250 or the sensors 255. For example, the computing devices 250 may transmit wireless signals corresponding to each food good on a particular shelf or shelving unit. Further, in some embodiments, the additional information regarding the food goods may be displayed in the augmented environment. For example, the additional information may indicate at least one of nutritional values, ingredients, health ratings, gluten status (e.g., whether gluten free or not), fat status (e.g., low fat or not), fiber status (e.g., high in fiber or not) of the food goods. Further, in some embodiments, the smart device 240 may filter out symbols corresponding to computing devices 250 and/or sensors 255 that do not meet particular nutritional settings indicated by the user. For example, each symbol corresponding to food goods that are high in fat or include gluten may be filtered out and not displayed in the augmented environment.

In a specific example, the environment 200 may include a road system (e.g., a surface road street, a highway, and/or a freeway). One or more vehicles using the road system may include the computing devices 250 and/or the sensors 255. In addition, the smart device 240 may correspond to another vehicle (e.g., a police car, highway patrol car, etc.). In some embodiments, a vehicle may not be following the laws, for example, by not carrying proper insurance, carrying current registration, or speeding. A user of the smart device 240 (e.g., a police officer) may determine to pull the vehicle over for not following the laws. Once pulled over, the smart device 240 may receive one or more wireless signals from the computing devices 250 in or the sensors 255 attached to the vehicle. The smart device 240, via the display 260, may display the augmented environment representative of the road system and/or the vehicle. In addition, the smart device 240 may display additional information regarding the vehicle, the driver, the passengers, or some combination thereof in the augmented environment. For example, the additional information may indicate vehicle history, driver history (e.g., a driving record or outstanding warrants), passenger history (e.g., outstanding warrants), or any other information corresponding to the vehicle, the driver, or the passengers.

In another specific example, the environment 200 may include a medical facility (e.g., a particular room of a hospital or an entire building). The computing devices 250 and/or the sensors 255 may be attached to tools such as scalpels, patients via patient clothing articles (e.g., wristbands), or additional medical devices. A user of the smart device 240 may enter the medical facility and the smart device 240 may receive the wireless signals from the computing devices 250 and/or the sensors 255. In some embodiments, the smart device 240, via the display 260, may display the augmented environment including a symbol representative of each of the tools and/or the medical devices within the medical facility. In addition, in some embodiments, the augmented environment may be displayed with a list of each of the tools and/or the medical devices within the medical facility. In these and other embodiments, the additional information including the list of each tool or medical device within the environment 200 may allow each tool and/or medical device to be closely tracked during or after procedures. In addition, display of the symbols in the augmented environment representative of the tools and the medical devices may permit a user to verify the location of each tool and medical device without obstructions causing problems. For example, the user may verify that a scalpel is below a towel without having to move the towel. In these and other embodiments, the additional information may include information identifying a patient (e.g., identifying information), a medical history of the patient, medications taken by the patient, or any other appropriate information.

In yet another specific example, the environment 200 may include an educational facility (e.g., a particular classroom or an entire building). The computing devices 250 and/or sensors 255 may correspond to student computing devices or be attached to student wristbands or student backpacks. For example, the computing devices 250 may include a tablet, a smart phone, a laptop, or another computing device associated with a student. A user of the smart device 240 (e.g., a teacher, principal, aid, or other school employee) may enter the educational facility and the smart device 240 may receive the wireless signals from the computing devices 250 and/or the sensors 255. In some embodiments, the smart device 240, via the display 260, may display the augmented environment including a symbol representative of each student that is present. In other embodiments, the augmented environment may be displayed to only include symbols of students that are not present. For example, the smart device 240 may include a list of all students enrolled in a class. The smart device 240 may receive the wireless signals and filter out each student that is present, such that only symbols (e.g., avatars) representative of students that are not present are displayed. In these and other embodiments, the additional information may include information identifying a student, an educational history of the student, medical considerations for the student, or any other appropriate information.

In another specific example, the environment 200 may include a neighborhood, city, state, or other geographic environment. The computing devices 250 and/or the sensors 255 may be attached to objects and/or landmarks within the environment 200. For example, a sensor 255 may be attached to a park bench within a city. A user of the smart device 240 may enter the environment 200 (e.g., sit on the park bench) and the smart device 240 may receive the wireless signals. In some embodiments, the smart device 240, via the display 260, may display the augmented environment including symbols representative of landmarks surrounding the object. For example, the augmented environment may display a location of a playhouse, a viewing area, a public attraction, or other landmark relative to the smart device 240 within the environment 200. In addition, in some embodiments, the augmented environment may be displayed with a list of information describing the landmarks, wait times for shows or lines, distance to the landmarks from a location of user, or historical information of the landmarks.

In yet another specific example, the environment 200 may correspond to a building, structure, or other place open to the public. The computing devices 250 and/or the sensors 255 may correspond to other people or be attached to other people. A user of the smart device 240 may enter the environment 200 and the smart device 240 may receive the wireless signals from the computing devices 250 and/or the sensors 255. In some embodiments, the smart device 240 may include a list of contacts or friends (e.g., friends on social media) of the user. The smart device 240 may filter out wireless signals that correspond to people not included in the list of contacts or friends. Further, the smart device 240, via the display 260, may display the augmented environment including a symbol (e.g., an avatar) representative of each person that is within the environment 200 and is included in the list of contacts or friends of the user.

Further, the wireless signals transmitted by the computing devices 250 and the sensors 255 may be encrypted to ensure secure transmission of the data included in the wireless signals. The wireless signals may be encrypted according to any appropriate encryption technique. For example, a symmetrical encryption algorithm (e.g., Advanced Encryption Standard (AES)) with a shared key that may be vendor specific, user specific, rotated or not, or derived from a shared information (e.g., device's mac address), or an asymmetrical encryption algorithm such as but not limited to ECDSA.

Modifications, additions, or omissions may be made to the environment 200 without departing from the scope of the present disclosure. The present disclosure more generally applies to the environment 200 including the smart device 240, one or more computing devices 250, one or more wireless networks 110, the network 245, one or more sensors 255, or any combination thereof. In addition, the present disclosure may also apply to the environment 200 including the smart device 240, one or more wireless networks 110, the network 245, one or more computing device 250, and zero sensors 255. Further, the present disclosure may also apply to the environment 200 including the smart device 240, one or more wireless networks 110, the network 245, one or more sensors 255, and zero computing devices 250.

Moreover, the separation of various components in the embodiments described herein is not meant to indicate that the separation occurs in all embodiments. In addition, it may be understood with the benefit of this disclosure that the described components may be integrated together in a single component or separated into multiple components.

Figure 3:
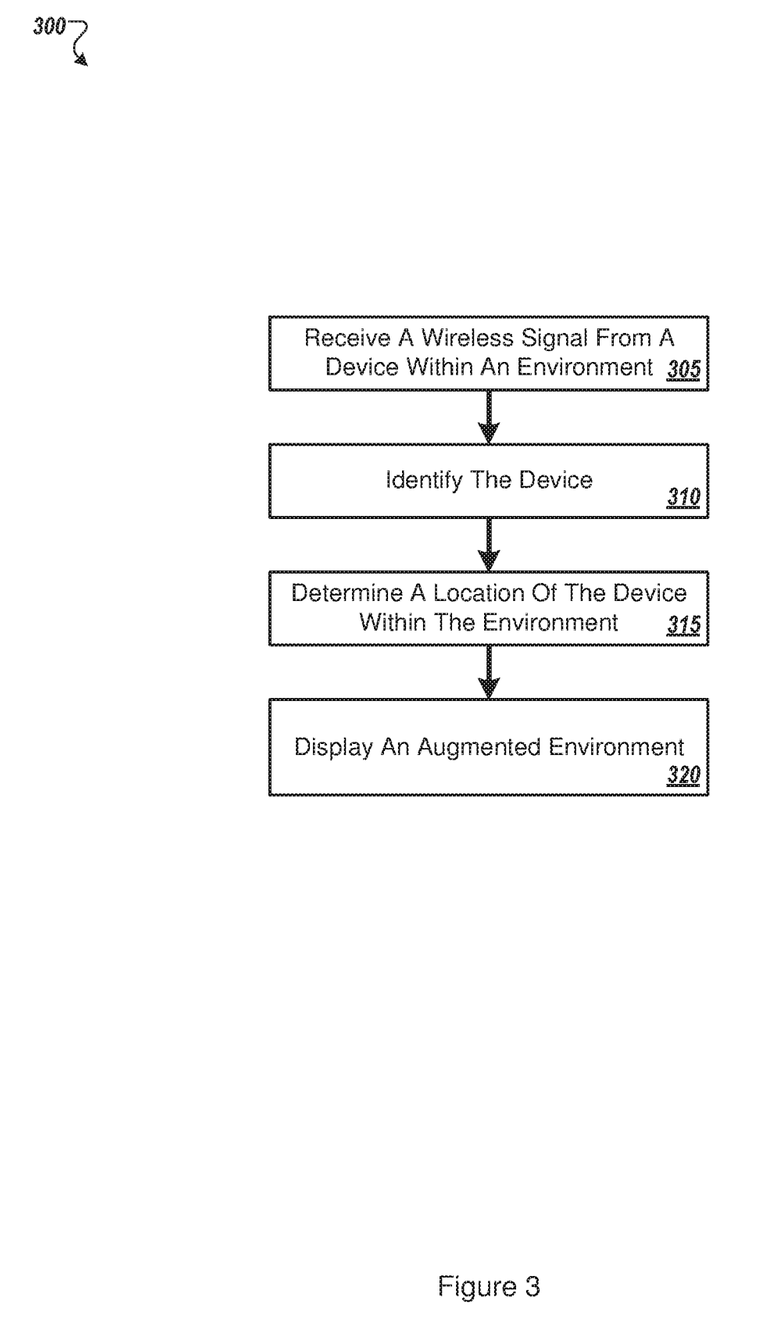
FIG. 3 is a flow diagram of an example method to augment reality by capturing signals using wireless radios.

FIG. 3 is a flow diagram of an example method to augment reality by capturing signals using wireless radios. For example, the method 300 may be performed by the smart device 240 of FIG. 2 to generate an augmented environment. The method 300 may be performed to generate the augmented environment representative of an environment including symbols representative of computing devices and/or objects within the environment. For example, the method may be performed to generate and display the augmented environment representative of the environment 200 including symbols representative of the computing devices 250 and/or the sensors 255 of FIG. 2.

The method may begin at block 305, where a wireless signal may be received from a device within the environment. For example, the wireless signal may be received by the smart device 240 from the computing devices 250 and/or the sensors 255 of FIG. 2.

At block 310, the device may be identified. In some embodiments, the device may be identified based on at least one of data and metadata included in the wireless signal. The data may include information identifying the device, the location of the device within the environment, the type of the device, or any other appropriate information. At block 315, the location of the device within the environment may be determined. The location of the device within the environment may be determined based on the data included in the wireless signal.

At block 320, the augmented environment may be displayed. The augmented environment may be representative of the environment. In addition, a symbol representative of the device may be displayed within the augmented environment. In some embodiments, the symbol may be displayed in a location within the augmented environment that corresponds to the location of the device within the environment. The augmented environment may include any type of data, such as an image, an icon, text, a graphic, etc. The data may include information about the device, including information about how to purchase the device or a similar device and/or services associated with the device.

Figure 4:
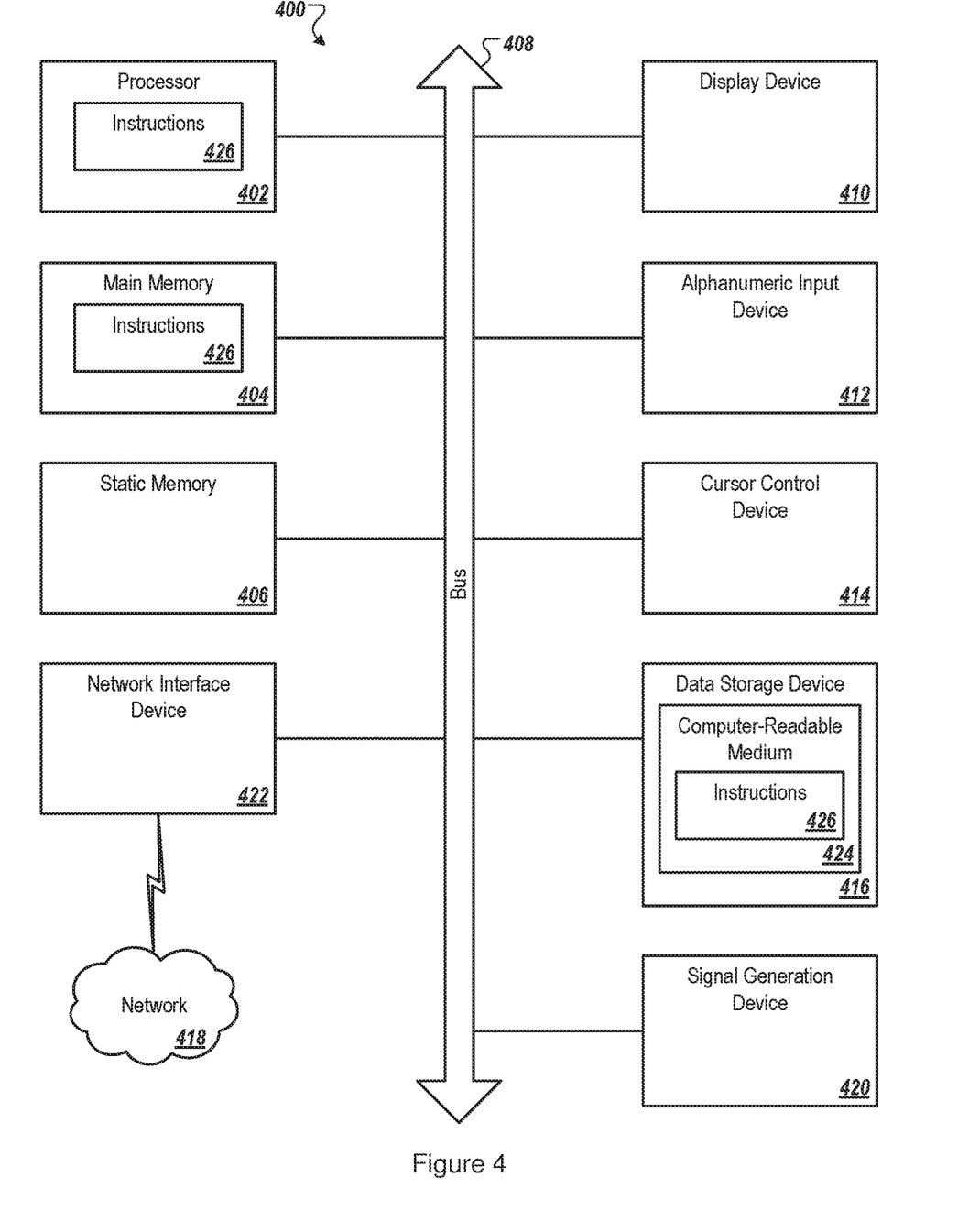
FIG. 4 is a diagrammatic representation of a machine in the example form of a computing device within which a set of instructions, for causing the machine to perform any one or more of the methods discussed herein, may be executed.

FIG. 4 illustrates a diagrammatic representation of a machine in the example form of a computing device 400 within which a set of instructions, for causing the machine to perform any one or more of the methods discussed herein, may be executed. The computing device 400 may include a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methods discussed herein, may be executed. In alternative embodiments, the machine may be connected (e.g., networked) to other machines in a LAN, an intranet, an extranet, or the Internet. The machine may operate in the capacity of a server machine in client-server network environment. The machine may include a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods discussed herein.

The example computing device 400 includes a processing device (e.g., a processor) 402, a main memory 404 (e.g., read-only memory (ROM), flash memory, dynamic random access memory (DRAM) such as synchronous DRAM (SDRAM)), a static memory 406 (e.g., flash memory, static random access memory (SRAM)) and a data storage device 416, which communicate with each other via a bus 408.

Processing device 402 represents one or more general-purpose processing devices such as a microprocessor, central processing unit, or the like. More particularly, the processing device 402 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 402 may also include one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein.

The computing device 400 may further include a network interface device 422 which may communicate with a network 418. The computing device 400 may also include a display device 410 (e.g., a liquid crystal display (LCD) or a cathode ray tube (CRT)), an alphanumeric input device 412 (e.g., a keyboard), a cursor control device 414 (e.g., a mouse) and a signal generation device 420 (e.g., a speaker). In at least one embodiment, the display device 410, the alphanumeric input device 412, and the cursor control device 414 may be combined into a single component or device (e.g., an LCD touch screen).

The data storage device 416 may include a computer-readable storage medium 424 on which is stored one or more sets of instructions 426 embodying any one or more of the methods or functions described herein. The instructions 426 may also reside, completely or at least partially, within the main memory 404 and/or within the processing device 402 during execution thereof by the computing device 400, the main memory 404 and the processing device 402 also constituting computer-readable media. The instructions may further be transmitted or received over a network 418 via the network interface device 422.

While the computer-readable storage medium 424 is shown in an example embodiment to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

The subject technology is illustrated, for example, according to various aspects described below. Various examples of aspects of the subject technology are described as numbered examples (1, 2, 3, first, second, third, etc.) for convenience. These are provided as examples and do not limit the subject technology. The aspects of the various implementations described herein may be omitted, substituted for aspects of other implementations, or combined with aspects of other implementations unless context dictates otherwise. For example, one or more aspects of example 1 below may be omitted, substituted for one or more aspects of another example (e.g., example 2) or examples, or combined with aspects of another example. The following is a non-limiting summary of some example implementations presented herein.

In a first example method, including receiving a wireless signal from a device within an environment, identifying the device based on at least one of data and metadata included in the wireless signal, determining a location of the device within the environment based on the data included the wireless signal, and displaying an augmented environment representative of the environment and a symbol representative of the device within the augmented environment, the symbol being displayed in a location within the augmented environment corresponding to the location of the device within the environment.

The method of the first example, where the metadata included in the wireless signal includes a type of signal for the wireless signal, and a communication protocol for the wireless signal.

The method of the first example, where the data included in the wireless signal includes a device identifier.

The method of the first example, where the data included in the wireless signal includes characteristic descriptions of the device.

The method of the first example, where the data included in the wireless signal includes information pertaining to purchasing the device or a service related to the device.

The method of the first example, where the method is performed by a mobile device configured to move at least within the environment.

The method of the first example, where displaying the augmented environment representative of the environment includes constructing a three-dimensional representation of the environment in the augmented environment including the device.

The method of the first example, where the environment includes a shopping area and the device is embedded in a storefront, the data included in the wireless signal includes at least one of sales descriptions, goods descriptions, and service descriptions available in a store corresponding to the storefront.

The method of the first example, where the environment includes a shopping area and the device is embedded in a shelf storing food goods, the data included in the wireless signal includes at least one of nutritional values, ingredients, and health ratings of the food goods.

The method of the first example, where the environment includes a road system and the device is embedded in a vehicle using the road system, the data included in the wireless signal includes at least one of a history, identifying information of a driver and identifying information of the vehicle.

The method of the first example, where the environment includes a medical facility and the device is embedded in a clothing article associated with a patient, the data included in the wireless signal includes at least one of identifying information of, medical history of, and medications taken by the patient.

The method of the first example, where the environment includes a medical facility and the device is embedded in a medical device, the symbol representative of the device is displayed in the augmented environment to track the medical device and to ensure that the medical device is not misplaced.

The method of the first example, where the environment includes an educational facility and the device is embedded in an object associated with a student, the method further including marking the student present based on the wireless signal.

The method of the first example, where the data included in the wireless signal includes a published MAC address of the device, the method further including determining the published MAC address of the device.

The method of the first example, where the environment includes a residential building and the device includes a sensor physically attached to a non-computing device.

A second example method, including receiving a first wireless signal from a first device within an environment, receiving a second wireless signal from a second device within the environment, identifying the first device based on at least one of data and metadata included in the first wireless signal, identifying the second device based on at least one of data and metadata included in the second wireless signal, determining locations of the first device and second device within the environment based on the first and second wireless signal, and displaying an augmented environment representative of the environment and symbols representative of the first device and the second device within the augmented environment, the symbols being displayed simultaneously and in locations within the augmented environment corresponding to the locations of the first device and the second device within the environment.

The method of the second example, where the data included in the first wireless signal includes characteristic descriptions of the first device, where a first symbols representative of the first device includes at least a portion of the characteristic descriptions of the first device.

A third example method, including receiving a wireless signal from a device within an environment, identifying the device based on at least one of data and metadata included in the wireless signal, determining information of the device within the environment based on the data included the wireless signal, and displaying an augmented reality element indicative of the information of the device, the augmented reality element being displayed in a location within an augmented environment corresponding to the location of the device within the augmented environment.

The method of the third example, where the augmented reality element includes a graphical representation of the device in the augmented environment.

The method of the third example, where the augmented reality element includes information on how to purchase the device or a service associated with the device.

Terms used herein and especially in the appended claims (e.g., bodies of the appended claims) are generally intended as "open" terms (e.g., the term "including" may be interpreted as "including, but not limited to," the term "having" may be interpreted as "having at least," the term "includes" may be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases may not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" may be interpreted to mean "at least one" or "one or more"); the same holds true for the use of definite articles used to introduce claim recitations.

In addition, even if a specific number of an introduced claim recitation is explicitly recited, those skilled in the art will recognize that such recitation may be interpreted to mean at least the recited number (e.g., the bare recitation of "two recitations," without other modifiers, means at least two recitations, or two or more recitations). Further, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, may be understood to contemplate the possibilities of including one of the terms, either of the terms, or both terms. For example, the phrase "A or B" may be understood to include the possibilities of "A" or "B" or "A and B."

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data which cause a general-purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

For the processes and/or methods disclosed, the functions performed in the processes and methods may be implemented in differing order as may be indicated by context. Furthermore, the outlined steps and operations are only provided as examples, and some of the steps and operations may be optional, combined into fewer steps and operations, or expanded into additional steps and operations.

This disclosure may sometimes illustrate different components contained within, or connected with, different other components. Such depicted architectures are merely exemplary, and many other architectures can be implemented which achieve the same or similar functionality.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

What is claimed is:

1. A method, comprising:
   receiving a wireless signal from a device within an environment;
   identifying the device based on at least one of data and metadata included in the wireless signal;
   determining a location of the device relative to at least two other devices within the environment; and
   displaying an augmented environment representative of the environment and a symbol representative of the device within the augmented environment, the symbol being displayed in a location within the augmented environment corresponding to the location of the device within the environment, wherein the data included in the wireless signal comprises information pertaining to purchasing the device or a service related to the device.

2. The method of claim 1, wherein the metadata included in the wireless signal comprises:
   a type of signal for the wireless signal; and
   a communication protocol for the wireless signal.

3. The method of claim 1, wherein the data included in the wireless signal comprises a device identifier.

4. The method of claim 1, wherein the data included in the wireless signal comprises characteristic descriptions of the device.

5. The method of claim 1, wherein the method is performed by a mobile device configured to move at least within the environment.

6. The method of claim 1, wherein displaying the augmented environment representative of the environment comprises constructing a three-dimensional representation of the environment in the augmented environment including the device.

7. The method of claim 1, wherein the environment includes a shopping area and the device is embedded in a storefront, the data included in the wireless signal comprises at least one of sales descriptions, goods descriptions, and service descriptions available in a store corresponding to the storefront.

8. The method of claim 1, wherein the environment includes a shopping area and the device is embedded in a shelf storing food goods, the data included in the wireless signal comprises at least one of nutritional values, ingredients, and health ratings of the food goods.

9. The method of claim 1, wherein the environment includes a road system and the device is embedded in a vehicle using the road system, the data included in the wireless signal comprises at least one of a history, identifying information of a driver and identifying information of the vehicle.

10. The method of claim 1, wherein the environment includes a medical facility and the device is embedded in a clothing article associated with a patient, the data included in the wireless signal comprises at least one of identifying information of, medical history of, and medications taken by the patient.

11. The method of claim 1, wherein the environment includes a medical facility and the device is embedded in a medical device, the symbol representative of the device is displayed in the augmented environment to track the medical device and to ensure that the medical device is not misplaced.

12. The method of claim 1, wherein the environment includes an educational facility and the device is embedded in an object associated with a student, the method further comprising marking the student present based on the wireless signal.

13. The method of claim 1, wherein the data included in the wireless signal comprises a published MAC address of the device, the method further comprising determining the published MAC address of the device.

14. The method of claim 1, wherein the environment includes a residential building and the device includes a sensor physically attached to a non-computing device.

15. A method, comprising:
   receiving a first wireless signal from a first device within an environment;
   receiving a second wireless signal from a second device within the environment;
   identifying the first device based on at least one of data and metadata included in the first wireless signal;
   identifying the second device based on at least one of data and metadata included in the second wireless signal;

determining locations of the first device and second device relative to each other within the environment; and displaying an augmented environment representative of the environment and symbols representative of the first device and the second device within the augmented environment, the symbols being displayed simultaneously and in locations within the augmented environment corresponding to the locations of the first device and the second device within the environment, wherein the augmented environment includes information on how to purchase the device or a service associated with the device.

16. The method of claim 15, wherein the data included in the first wireless signal comprises characteristic descriptions of the first device, wherein a first symbols representative of the first device includes at least a portion of the characteristic descriptions of the first device.

17. A method, comprising:
receiving a wireless signal from a device within an environment;
identifying the device based on at least one of data and metadata included in the wireless signal;
determining information of the device within the environment based on the data included the wireless signal; and
displaying an augmented reality element indicative of the information of the device, the augmented reality element being displayed in a augmented reality (AR) location within an augmented environment, the AR location being different than an actual location of the device within the environment, wherein the augmented reality element includes information on how to purchase the device or a service associated with the device.

18. The method of claim 17, wherein the augmented reality element includes a graphical representation of the device in the augmented environment.

* * * * *